US012786497B2

(12) United States Patent
Han et al.

(10) Patent No.: US 12,786,497 B2
(45) Date of Patent: Nov. 3, 2026

(54) METHOD FOR DISPLAYING USER-CREATED CONTENT IN VIDEO CONTENT AND SERVICE SERVER USING SAME

(71) Applicant: ALTIMEDIA CORPORATION, Seoul (KR)

(72) Inventors: Jung Sam Han, Seoul (KR); Ji Na Kim, Seoul (KR)

(73) Assignee: ALTIMEDIA CORPORATION, Seoul (KR)

( * ) Notice: Subject to any disclaimer, the term of this patent is extended or adjusted under 35 U.S.C. 154(b) by 64 days.

(21) Appl. No.: 18/988,645

(22) Filed: Dec. 19, 2024

(65) Prior Publication Data

US 2025/0211810 A1 Jun. 26, 2025

(30) Foreign Application Priority Data

Dec. 26, 2023 (KR) ........................ 10-2023-0191304

(51) Int. Cl.
*H04N 21/2743* (2011.01)
*G06F 16/735* (2019.01)
(Continued)

(52) U.S. Cl.
CPC ....... *H04N 21/2743* (2013.01); *G06F 16/735* (2019.01); *G06F 16/7867* (2019.01); *G06F 16/787* (2019.01)

(58) Field of Classification Search
CPC ........... H04N 21/2743; H04N 21/8547; H04N 21/44016; H04N 21/23424;
(Continued)

(56) References Cited

U.S. PATENT DOCUMENTS

2009/0148124 A1* 6/2009 Athsani .............. H04N 21/6582 386/241
2014/0096167 A1* 4/2014 Lang .................. H04N 21/4788 725/91

(Continued)

FOREIGN PATENT DOCUMENTS

KR 10-2009-0120547 A 11/2009
KR 10-2015-0002080 A 1/2015

(Continued)

OTHER PUBLICATIONS

Office Action for KR 10-2023-0191304 by Korean Intellectual Property Office dated Aug. 1, 2025.

*Primary Examiner* — Cynthia M Fogg
(74) *Attorney, Agent, or Firm* — BROADVIEW IP LAW, PC

(57) ABSTRACT

The disclosure relates to a method for displaying user-created content in video content and a service server using the same, and method of displaying user-created content (UCC) in video content provided by a service server according to an embodiment of the disclosure may include receiving user-created content uploaded in connection with the video content; designating an exposure time of the user-created content among the running time of the video content, based on the upload time of the user-created content and the meta information of the user-created content; and displaying the user-created content on a control layer corresponding to the video content when the exposure time is reached during playback of the video content.

12 Claims, 7 Drawing Sheets

(51) Int. Cl.
*G06F 16/78* (2019.01)
*G06F 16/787* (2019.01)

(58) Field of Classification Search
CPC ....... H04N 21/23614; H04N 21/25808; H04N 21/25841; H04N 21/4343; H04N 21/2187; H04N 21/21805; H04N 21/2665; H04N 21/4223; H04N 21/4622; H04N 21/23418; G06F 16/735; G06F 16/7867; G06F 16/787
USPC .......................................................... 725/115
See application file for complete search history.

(56) References Cited

U.S. PATENT DOCUMENTS

| | | | | |
|---|---|---|---|---|
| 2015/0341686 | A1* | 11/2015 | Wen | H04N 21/4113<br>725/109 |
| 2016/0234551 | A1* | 8/2016 | Allegretti | H04N 21/854 |
| 2018/0234738 | A1* | 8/2018 | Sarkar | H04N 21/472 |
| 2019/0208257 | A1* | 7/2019 | Hsiao | H04N 21/4882 |
| 2020/0007958 | A1* | 1/2020 | Wondra | H04N 21/47205 |
| 2020/0288200 | A1* | 9/2020 | Ho | H04N 21/2187 |
| 2020/0329002 | A1* | 10/2020 | Wiklof | H04L 51/18 |
| 2022/0038404 | A1* | 2/2022 | Plom | H04N 21/84 |
| 2023/0333725 | A1 | 10/2023 | Cho | |

FOREIGN PATENT DOCUMENTS

| | | | | |
|---|---|---|---|---|
| KR | 10-2016-0038973 | A | 4/2016 | |
| KR | 10-2023-0050656 | A | 4/2023 | |
| WO | WO-2024198485 | A1 * | 10/2024 | H04N 21/44016 |

* cited by examiner

METHOD FOR DISPLAYING USER-CREATED CONTENT IN VIDEO CONTENT AND SERVICE SERVER USING SAME

CROSS-REFERENCE TO RELATED APPLICATION(S)

This application is based on and claims priority under 35 U.S.C. 119 to Korean Patent Application No. 10-2023-0191304, filed on Dec. 26, 2023, in the Korean Intellectual Property Office, the disclosure of which is herein incorporated by reference in its entirety.

BACKGROUND OF THE INVENTION

1. Field of the Invention

The disclosure relates to a method of displaying user-created content in video content, which allows a user to directly upload content related to corresponding video content in video content provided through Internet protocol television (IPTV) and share the content with other users, and to a service server using the same.

2. Description of the Prior Art

Typically, Internet protocol television (IPTV) is a television system that may provide two-way television services by using ultra-fast Internet networks, and provides two-way television services such as information services, video content, and broadcasting by using ultra-fast Internet.

IPTV is not much different from general cable broadcasting or satellite broadcasting in that it provides broadcasting content including video, but its major feature is the added interactivity. Unlike general public broadcasting, cable broadcasting, or satellite broadcasting, the use of IPTV is expanding because viewers may only watch programs they want to watch at their convenience.

However, in the case of IPTV, only the information provided by the content provider is received, and the viewer needed to search and identify online when he or she needs additional information other than the information provided by the content provider. However, in the case of searching while watching a broadcast, it may be difficult to focus on the original video, and it may be difficult to find information related to the video.

SUMMARY OF THE INVENTION

The disclosure provides a method for displaying user-created content in video content and a service server using the same, which may provide user-created content uploaded by users together with video content.

The disclosure provides a method for displaying user-created content in video content and a service server using the same, which allows a user to directly upload information related to video content, so that other users may easily obtain various information related to video content.

The disclosure provides a method for displaying user-created content in video content and a service server using the same, which may provide a new user experience by sharing various reactions of users to video content.

A method of displaying user-created content in video content according to an embodiment of the disclosure may include receiving user-created content, which is provided by a service server, uploaded in connection with the video content; designating an exposure time of the user-created content among the running time of the video content, based on the upload time of the user-created content and the meta information of the user-created content; and displaying the user-created content on a control layer corresponding to the video content when the exposure time is reached during playback of the video content.

The method of displaying user-created content in video content according to an embodiment of the disclosure may further include determining the relevance with the video content by using the meta information of the user-created content; and filtering the uploaded user-created content based on the relevance.

The filtering may be to filter out the duplicate content uploaded late based on the upload time if there is duplicate content uploaded more than a configured number of times among the user-created content.

The receiving may be to receive user-created content from a user terminal or a set-top box.

The video content may include at least one of a real-time broadcast video and a video on demand (VOD).

The meta information may include at least one of keyword information configured by a user in the user-created content, geographical location information in which the user-created content is generated, generation date information, capacity information, content type information, and linked video content information.

The designating the exposure time may be to designate a time when additional information included in the video content is extracted within a configuration time range and additional information matching the meta information is included based on the upload time as the exposure time of the user-created content.

The designating an exposure time may be to configure the configuration time range as the entire running time of the video content when the upload time is before broadcast of the video content.

The additional information may include at least one of the title, a performer, episode information, keyword information configured in the video content, and geographical location information appearing in the video content.

The displaying may be to provide a list of the user-created content included within a configuration time interval when there are when there are the exposure time points more than a limit number within the configuration time interval.

The displaying may be to sequentially slide and display the user-created content included in the list, based on the exposure time or the upload time.

According to an embodiment of the disclosure, a computer program stored in a medium to execute a method of displaying user-created content in video content may be implemented.

A service server displaying user-created content (UCC) in video content according to an embodiment of the disclosure may include a processor and, the processor may receive user-created content uploaded in connection with the video content; designate an exposure time of the user-created content among the running time of the video content, based on the upload time of the user-created content and the meta information of the user-created content; and display the user-created content on a control layer corresponding to the video content when the exposure time is reached during playback of the video content.

In addition, the solution to the above-described problems does not list all the features of the disclosure. Various features of the disclosure and the advantages and effects thereof may be understood in more detail by referring to the specific embodiments below.

According to a method for displaying user-created content in video content and a service server using the same according to an embodiment of the disclosure, user-created content uploaded by a user may be provided together with video content. That is, the user may directly upload information related to video content, so other users may easily obtain various information related to video content.

According to a method for displaying user-created content in video content and a service server using the same according to an embodiment of the disclosure, it is possible to provide a new user experience by sharing various reactions of users to video content.

However, the effects that may be achieved by the method for displaying user-created content in video content according to embodiments of the disclosure and the service server using the same are not limited to those mentioned above, and other effects that are not mentioned will be clearly understood by those skilled in the art to which the disclosure belongs from the description below.

BRIEF DESCRIPTION OF THE DRAWINGS

The above and other aspects, features and advantages of the disclosure will be more apparent from the following detailed description taken in conjunction with the accompanying drawings, in which.

DETAILED DESCRIPTION OF THE EXEMPLARY EMBODIMENTS

Figure 1:
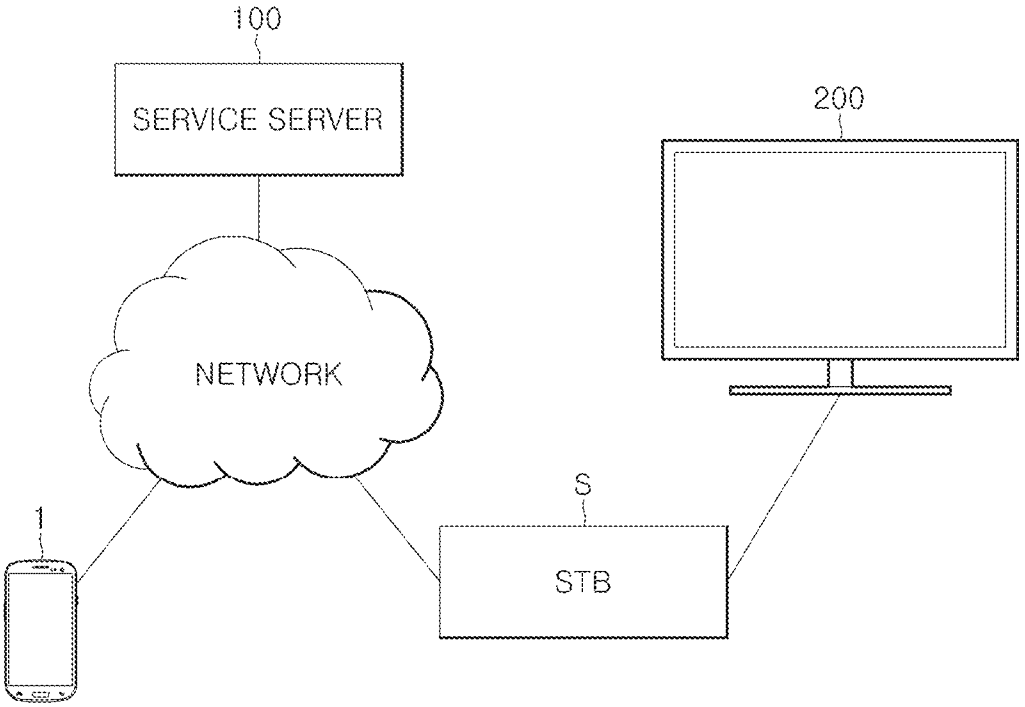
FIG. 1 is a schematic diagram illustrating a video content providing system according to an embodiment of the disclosure.

Hereinafter, the embodiments disclosed in this specification will be described in detail with reference to the accompanying drawings, but the same or similar components will be given the same reference numbers regardless of the drawing codes, and redundant descriptions thereof will be omitted. The suffixes "module" and "unit" for components used in the following description are given or used interchangeably only for the convenience of writing the specification, and do not have distinct meanings or roles in themselves. That is, the term "unit" used in the disclosure refers to a hardware component such as software, FPGA, or ASIC, and "unit" performs certain roles. However, "unit" is not limited to software or hardware. The "unit" may be configured to reside on an addressable storage medium or may be configured to execute one or more processors. Therefore, as an example, the "unit" includes components such as software components, object-oriented software components, class components, and task components, processes, functions, attributes, procedures, subroutines, segments of program code, drivers, firmware, microcode, circuitry, data, database, data structures, tables, arrays, and variables. A function provided within components and "units" may be combined into a smaller number of components and "units" or further separated into additional components and "units".

In addition, in describing the embodiments disclosed in this specification, if it is determined that a detailed description of a related known technology may obscure the gist of the embodiments disclosed in this specification, the detailed description thereof will be omitted. In addition, the accompanying drawings are only intended to facilitate easy understanding of the embodiments disclosed herein, and the technical ideas disclosed herein are not limited by the accompanying drawings, and should be understood to include all the modifications, equivalents and substitutions which belong to the idea and technical scope of the disclosure.

FIG. 1 is a schematic diagram illustrating a video content providing system according to an embodiment of the disclosure.

Referring to FIG. 1, the video content providing system according to an embodiment of the disclosure may include a user terminal 1, a service server 100, a display device 200, and a set-top box S.

Hereinafter, the video content providing system according to an embodiment of the disclosure is described with reference to FIG. 1.

The user terminal 1 may be a mobile communication terminal such as a smartphone carried by a user. The user terminal 1 may execute various types of applications, and may provide the user a running application by displaying the application in a visual, auditory, tactile, and the like manner. The user terminal 1 may include a display unit for visually displaying an application, and may include an input unit for receiving a user's input, a communication unit, a memory in which at least one program is stored, and a processor.

The user terminal 1 may be a mobile terminal such as a smartphone or a tablet PC, and may include a fixed device such as a desktop according to an embodiment. The user terminal 1 may include a mobile phone, a smartphone, a laptop computer, a digital broadcasting terminal, a personal digital assistant (PDA), a portable multimedia player (PMP), a slate PC, a tablet PC, an Ultrabook, a wearable device (e.g., a smartwatch, a smart glasses, a head mounted display (HMD)), and the like.

The user terminal 1 may be connected to an external service server 100 and the like through a communication network. The communication network may include a wired network and a wireless network, and specifically, may include various networks such as a local area network (LAN), a metropolitan area network (MAN), and a wide area network (WAN). In addition, the communication network may include the well-known World Wide Web (WWW). However, the communication network according to the disclosure is not limited to the networks listed above, and may include a well-known wireless data network, a well-known telephone network, a well-known wired or wireless television network, and the like.

The service server 100 may be a server that provides various types of content, and the display device 200 may access the service server 100 to receive video content selected by the user. The service server 100 may support streaming of various types of video on demand (VOD)

videos or provide real-time broadcasting, etc. The service server 100 may provide a video layer in which video content is displayed and a control layer for performing a control function for the video content, and in this case, the UI of the control layer may be changed in various ways depending on the embodiment. In addition, depending on the embodiment, the service server 100 may provide a video layer and the set-top box S may also configure and provide a control layer.

The display device 200 may generate an image or video based on the received video signal, and provide the image or video to the user by displaying the same visually or audibly. The display device 200 may include a liquid crystal display (LCD), a thin film transistor-liquid crystal display (TFT LCD), an organic light-emitting diode (OLED), a flexible display, a 3D display, an e-ink display, etc.

In the case of the display device 200 such as an Internet Protocol Television (IPTV), a smart TV, or the like, the display device 200 may directly access the service server 100 or the like to receive and display a video layer corresponding to the video signal and a control layer providing a user interface (UI) such as a home screen, etc.

However, there may be a case in which the display device 200 does not support access to a service platform server or the like, and in this case, it is also possible to communicate with the service server 100 through the set-top box S. The set-top box S may be connected to the service server 100 through a wired network such as an optical cable or a coaxial cable, and may be connected to the display device 200 through a wired cable such as a high definition multimedia interface (HDMI), etc. The set-top box S may display a video layer and a control layer provided from the service server 100 on the display device 200, and may be implemented so that the user may use various services by selecting necessary menu functions from the control layer.

In general, the video content provided by the service server 100 is unilaterally displayed on the display device 200, and it has been difficult for the user of the display device 200 to upload content related to the video content and share the same with others. In other words, it has been difficult to provide an improved user experience to users who watch the video content by identifying users' reactions to the video content or sharing other related content.

Accordingly, in the video content providing system according to one embodiment of the disclosure, it is intended to provide a method of providing user-created content generated by users watching the video content together with the video content through the service server 100. Hereinafter, a service server according to an embodiment of the disclosure is described.

Figure 2:
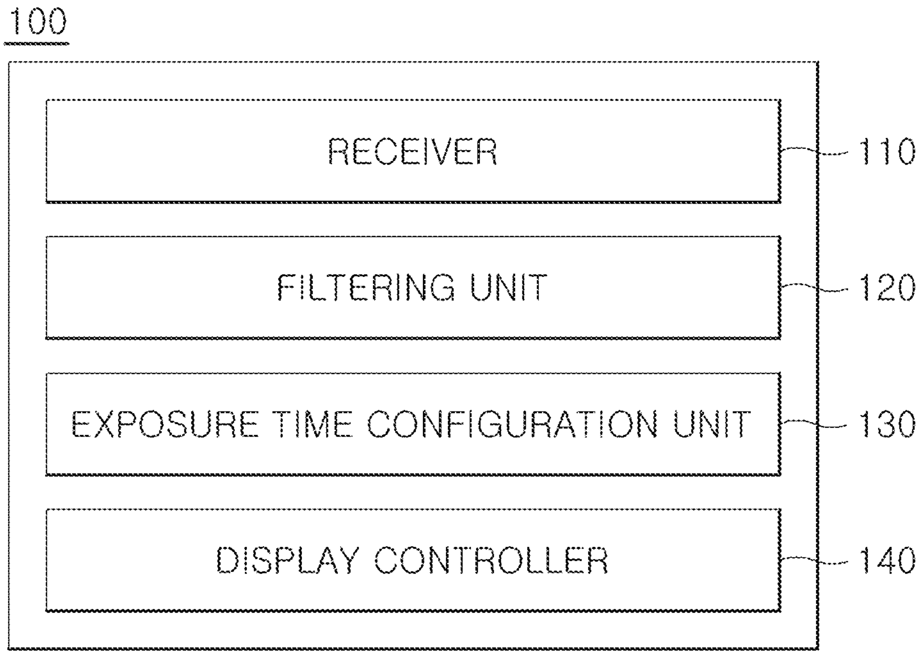
FIG. 2 is a block diagram illustrating a service server according to an embodiment of the disclosure.

FIG. 2 is a block diagram illustrating a service server 100 according to an embodiment of the disclosure.

Referring to FIG. 2, the service server 100 according to an embodiment of the disclosure may include a receiver 110, a filtering unit 120, an exposure time configuration unit 130, and a display controller 140.

The receiver 110 may receive uploaded user-created content in conjunction with video content. The user-created content may text, images, videos, characters, sounds, URL addresses, HTML, or a combination thereof generated by the user, and may be generated in a way such as modifying or transforming other content by the user depending on the embodiment. In addition, the video content may be a real-time broadcast video or VOD video provided by the service server 100, and may also include various types of content provided by the service server 100.

Figure 3:
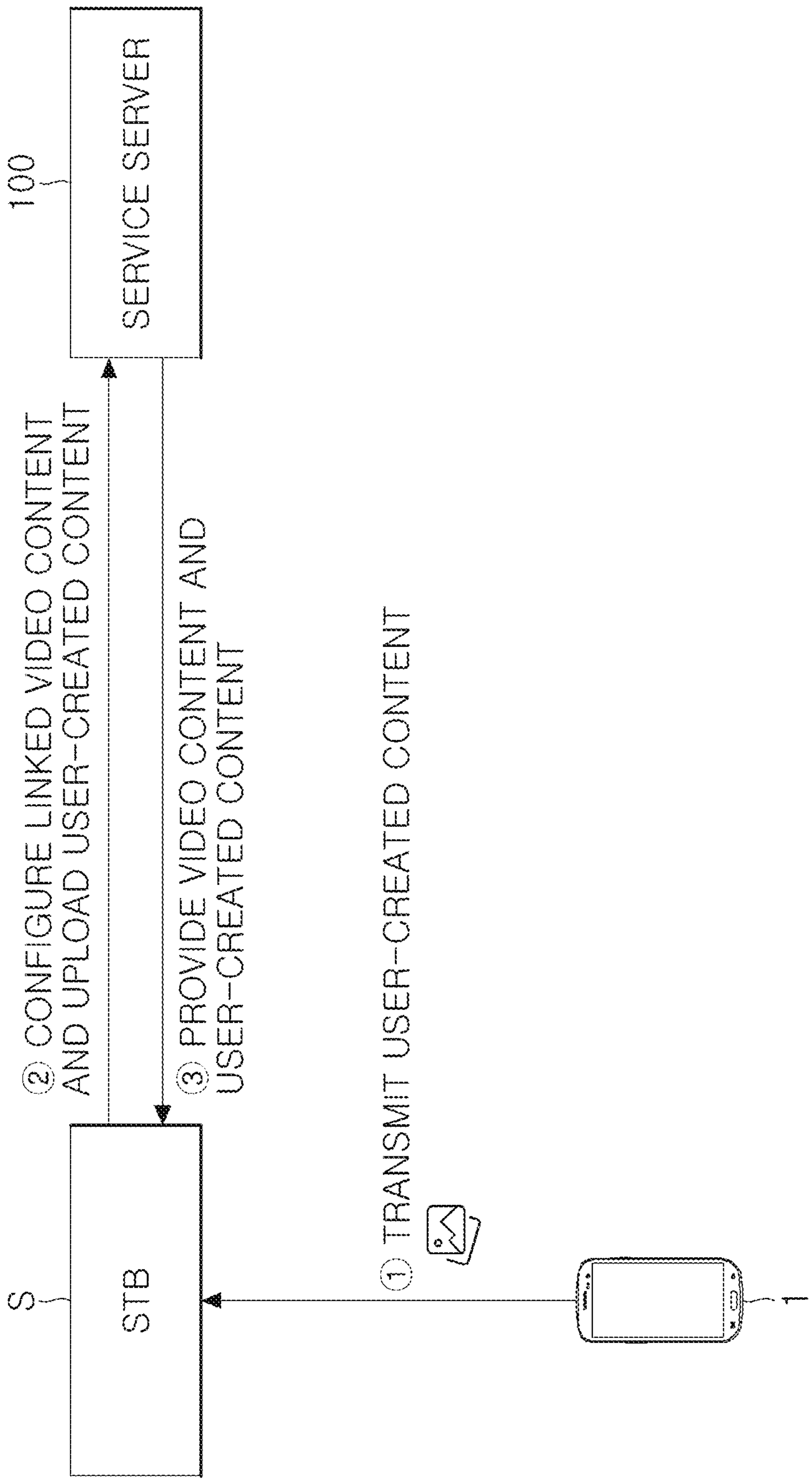
FIG. 3 is a schematic diagram illustrating content upload using a set-top box according to an embodiment of the disclosure.
Figure 4:
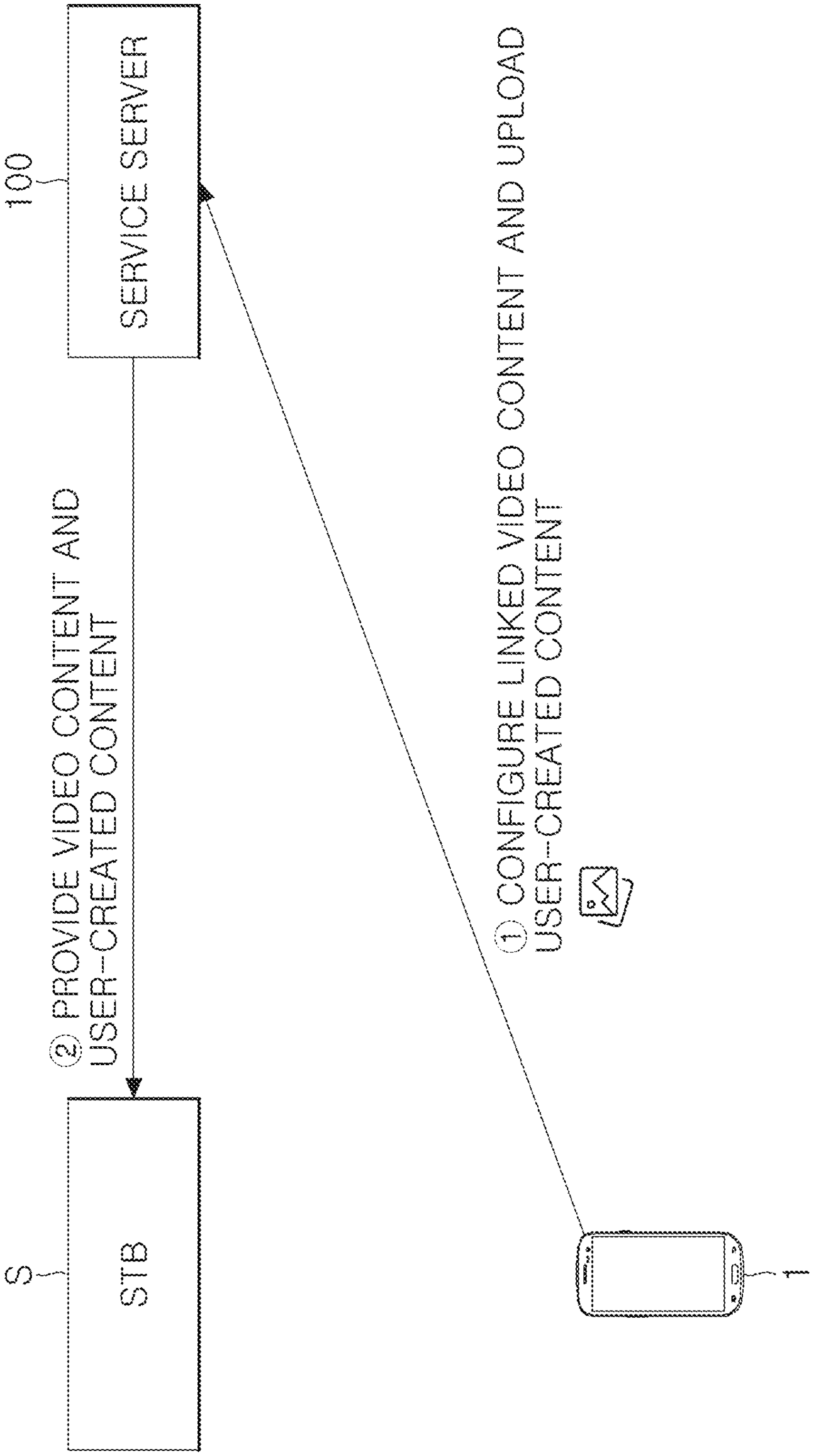
FIG. 4 is a schematic diagram illustrating content upload using a user terminal according to an embodiment of the disclosure.

As illustrated in FIGS. 3 and 4, the receiver 110 may receive user-created content through the set-top box S or directly receive user-created content from the user terminal 1.

Specifically, referring to FIG. 3, the user may first connect his/her user terminal 1 to the set-top box S through short-range communication such as Bluetooth, NFC, Wi-Fi, etc. Thereafter, the user-created content stored in the user terminal 1 may be transmitted to the set-top box S, and the set-top box S may upload the received user-created content to the service server 100 according to the user's input. For example, after registering various types of user-created content in advance in the set-top box S, the user may select and apply the desired user-created content to each video content provided by the service server 100.

In addition, as illustrated in FIG. 4, the user may directly access the service server 100 by using the user terminal 1, and may transmit user-created content by designating the desired video content among the video content in the service server 100. In this case, a dedicated application for communication with the service server 100 may be installed in the user terminal 1, and the receiver 110 may receive user-created content through the dedicated application. Depending on an embodiment, it is also possible to limit the user terminal 1 to upload user-created content through the dedicated application.

The filtering unit 120 may perform filtering on user-created content received through the receiver 110. The filtering unit 120 may determine a relevance with the video content by using meta information of the user-created content, and may filter the uploaded user-created content based on the relevance.

The user may directly designate video content to upload desired user-created content, but in some cases, it is also possible to indiscriminately upload advertisement messages that are not related to the video content. Accordingly, the filtering unit 120 may be used to determine the correlation between the user-created content and the video content, and if the correlation is low, the user-created content may not be reflected in the video content. In this case, the meta information of user-created content may include keyword information configured by the user in the user-created content, geographical location information in which the user-created content is generated, generation date information, capacity information, content type (image, video, text, etc.) information, linked video content information, etc.

For example, if the video content is a video introducing a good restaurant, the user may upload an image of the restaurant as user-created content, and in this case, the filtering unit 120 may extract geographical location information in which the image was captured based on meta information included in the image. In this case, the video content may also include additional information such as the geographical location information in which the video content was captured. Accordingly, the filtering unit 120 may determine the correlation by comparing the geographical location information with each other, and may determine whether to filter the corresponding user-created content accordingly.

In addition, since user-created content is exposed to a large number of users, it is necessary to filter out obscene or violent content, abusive language, or discriminatory expressions. Accordingly, the filtering unit 120 may filter out words, images, videos, etc. included in the received user-created content and exclude problematic user-created content.

Additionally, even if it is user-created content related to the corresponding video content, there may be cases where the same user-created content is uploaded repeatedly. In this case, if there is duplicate content uploaded more than a configured number of times among user-created content, the filtering unit 120 may filter and exclude duplicate content uploaded late based on the upload time. Here, whether it is the same user-created content may be determined based on the URL address or file name connected to the corresponding user-created content. In addition, it is also possible to extract the same content by performing an image search or video search for the uploaded user-created content.

In order to prevent duplicate uploads of the same user-created content, the service server 100 may limit the number of user-created content that may be uploaded per day for each user. For example, based on each user ID or IP address, the upload of user-created content may be limited to three per day.

The exposure time configuration unit 130 may designate the exposure time of the user-created content during the running time of the video content based on the upload time of the user-created content and the meta information of the user-created content. That is, the exposure time configuration unit 130 may designate the exposure time not as the time when the user-created content is uploaded, but as the time when a scene related to the user-created content appears in the video content.

For example, if the video content is a video introducing a good restaurant, the location of the restaurant to be introduced may be announced first in this episode, and then a video corresponding to the actual restaurant may appear. In this case, when announcing the restaurant, users may find and upload photos of their visits the restaurant, but the video of the restaurant may not appear in the video content at the time of upload. That is, when user-created content is exposed based on the upload time, the effect of providing user-created content may be degraded, and the response of viewers may also be low. Accordingly, the exposure time configuration unit 130 may expose the user-created content when a related scene appears in the video content by designating the exposure time by further considering the meta information of the corresponding user-created content along with the upload time.

Specifically, the exposure time configuration unit 130 may extract additional information included in the video content within the configuration time range based on the upload time, and designate the time at which the additional information matching the meta information is included as the exposure time of the user-created content. Here, the additional information may include the title, performer, episode information, and keyword information configured in the video content, and geographical location information displayed in the video content, etc.

For example, the video content may be a video introducing a good restaurant, and may include geographical location information for each scene as additional information. The video content may sequentially introduce three restaurants, A, B, and C, and the user may upload a review of restaurant C as user-created content while restaurant B is being introduced. In this case, the exposure time configuration unit 130 may compare the geographical location information shown in the meta information of the user-created content with the geographical location information shown in the additional information of the video content, and since the geographical location information at the time of upload is different from each other, the exposure time of the corresponding user-created information may be configured to later. Thereafter, since the meta information and additional information match each other when the video content introduces the C restaurant, the exposure time configuration unit 130 may designate the exposure time of the corresponding user-created content to match the time of introducing restaurant C.

Additionally, in the case where the video content is a real-time broadcast, the range determined by the exposure time configuration unit 130 may be limited to a certain configuration time range in order to minimize the amount of computation, etc. However, in the case where the video content is a VOD video or before the broadcast of the video content, there may be no need for limitation, so the configuration time range may be configured to the entire running time of the video content.

The display controller 140 may display user-created content on a control layer corresponding to the video content when the exposure time is reached during playback of the video content.

Figure 5:
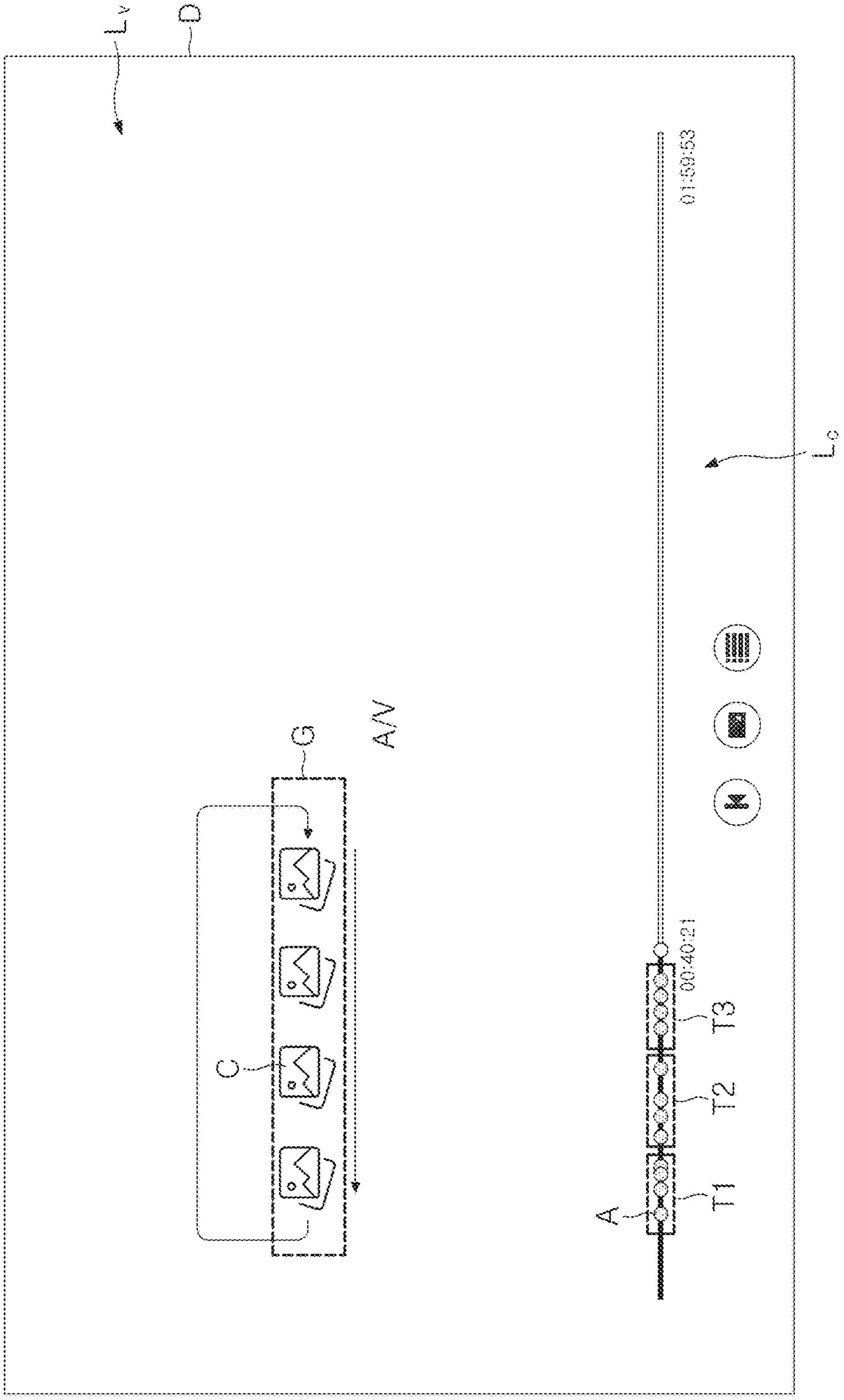
FIG. 5 is a schematic diagram illustrating user-created content displayed in video content according to an embodiment of the disclosure.

Referring to FIG. 5, a video layer $L_v$ on which video content is displayed and a control layer $L_c$ for the corresponding video layer $L_v$ may be displayed on the screen D of the display device 200. In the case where the video content is a real-time broadcast, a mini electronic program guide (EPG), etc. may appear on the control layer $L_c$, and in the case where the video content is a VOD video, a playback control key, etc. may appear on the control layer $L_c$.

As illustrated in FIG. 5, the playback bar on the control layer $L_c$ may display objects A corresponding to each user-created content C, and when each object A is selected, the corresponding user-created content C may be displayed.

Here, there may be a case where there are more than the limit number of exposure time points within the configuration time interval, and in this case, the display controller 140 may provide a list G of user-created content C included within the configuration time interval. That is, when a plurality of exposure time points overlaps within a narrow time interval, it may be difficult for the user to distinguish and select each user-created content. Accordingly, as illustrated in FIG. 5, configuration time intervals may be divided into T1, T2, and T3, and if any one of the configuration time intervals T1, T2, and T3 is selected, a list G of all user-created content included in the corresponding configuration time interval may be provided. In this case, the user may select desired user-created content C based on the corresponding list G.

In addition, according to an embodiment, as illustrated in FIG. 5, the display controller 140 may sequentially slide and display user-created content C included in the list G based on the exposure time or upload time. That is, since a plurality of user-created content C is exposed by rotating or sliding sequentially, the user may identify the user-created content C as a whole, and among them, a desired user-created content C may be selected and displayed.

Figure 6:
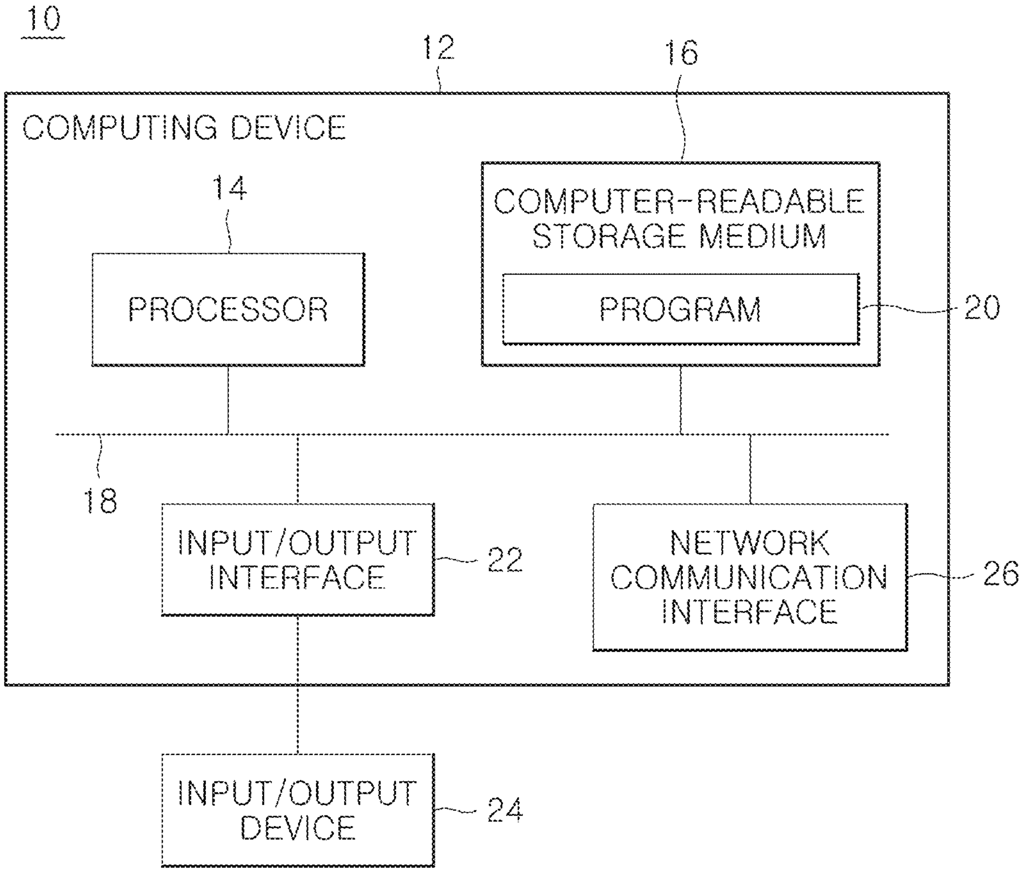
FIG. 6 is a block diagram illustrating a computing device according to an embodiment of the disclosure.

FIG. 6 is a block diagram illustrating a computing environment 10 suitable for use in exemplary embodiments. In the illustrated embodiment, each component may have different functions and capabilities other than those described below, and may include additional components other than those described below.

The illustrated computing environment 10 includes a computing device 12. In an embodiment, the computing device 12 may be a service server 100 that displays user-created content within video content. According to an embodiment, the computing device 12 includes at least one processor 14, a computer-readable storage medium 16, and a communication bus 18. The processor 14 may cause the computing device 12 to operate according to the exemplary embodiments mentioned above. For example, the processor 14 may execute one or more programs stored in the computer-readable storage medium 16. The one or more programs may include one or more computer-executable instructions, and the computer-executable instructions may be configured to cause the computing device 12 to perform operations according to exemplary embodiments when executed by the processor 14.

The computer-readable storage medium 16 is configured to store computer executable instructions or program codes, program data, and/or other suitable forms of information. The program 20 stored in the computer-readable storage medium 16 includes a set of instructions executable by the processor 14. In an embodiment, the computer-readable storage medium 16 may be a memory (volatile memory such as random access memory, nonvolatile memory, or an appropriate combination thereof), one or more magnetic disk storage devices, optical disk storage devices, flash memory devices, other types of storage media accessed by the computing device 12 and capable of storing desired information, or a suitable combination thereof.

The communication bus 18 interconnects other various components of the computing device 12, including the processor 14 and the computer-readable storage medium 16.

The computing device 12 may also include one or more input/output interfaces 22 that provide interfaces for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or a track pad), a keyboard, a touch input device (such as a touch pad or a touch screen), a voice or sound input device, an input device such as various types of sensor devices and/or a photographing device, and/or an output device such as a display device, a printer, a speaker and/or a network card. The exemplary input/output device 24 may be included inside the computing device 12 as a component constituting the computing device 12, or may be connected to the computing device 12 as a separate device distinct from the computing device 12.

Figure 7:
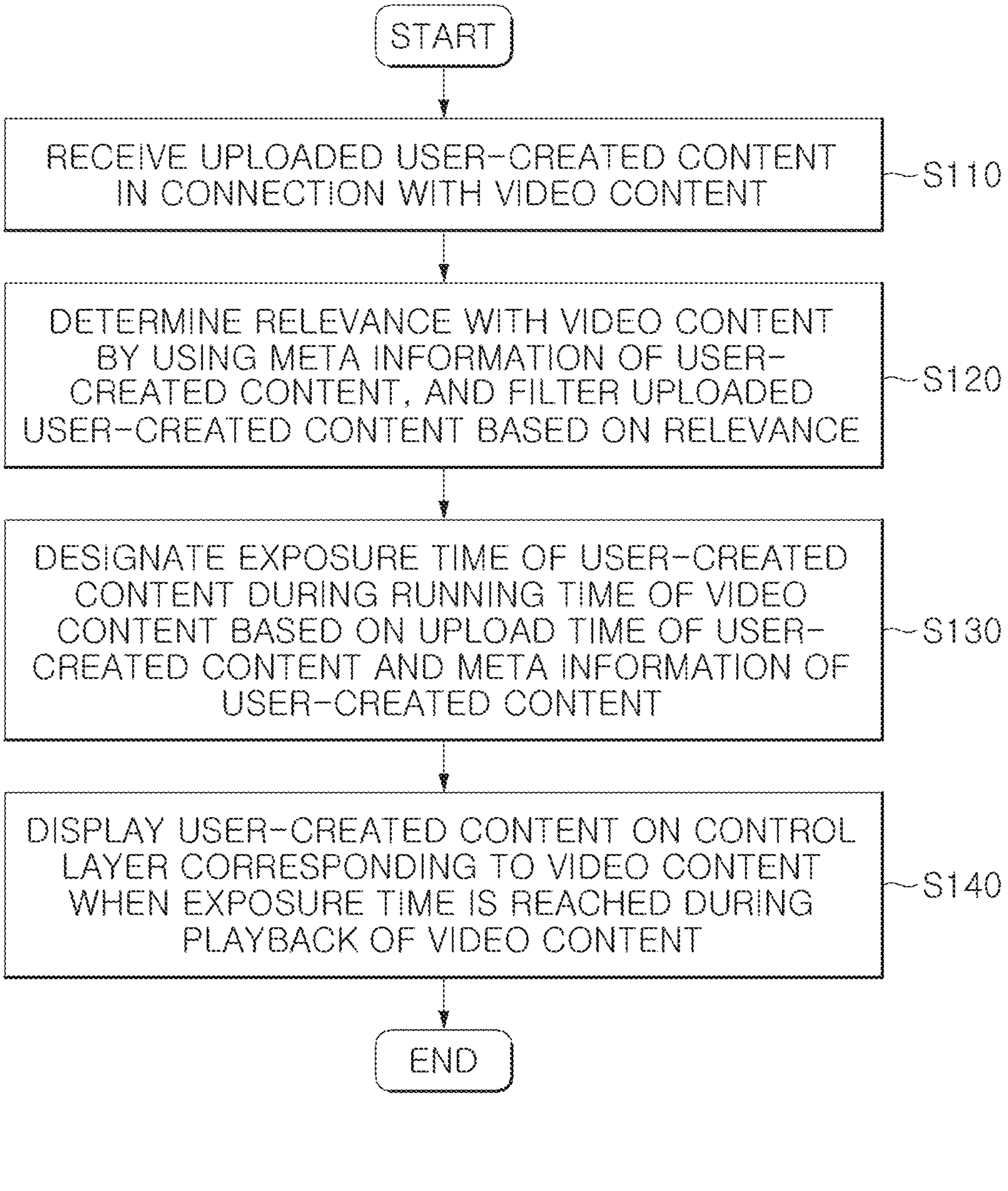
FIG. 7 is a flowchart illustrating a method of displaying user-created content in video content of a service server according to an embodiment of the disclosure.

FIG. 7 is a flowchart illustrating a method of displaying user-created content in video content of a service server according to an embodiment of the disclosure. Each step of FIG. 7 may be performed by a service server according to an embodiment of the disclosure.

Referring to FIG. 7, the service server may receive uploaded user-created content in connection with video content (S110). The user-created content may be text, images, videos, characters, sounds, URL addresses, and HTML generated by the user, or combinations thereof, and depending on an embodiment, the user-created content may be generated by the user modifying or altering other content. In addition, the video content may be a service real-time broadcast video or VOD video, and the service server may receive user-created content from a user terminal or set-top box.

Thereafter, the service server may use the meta information of the user-created content to determine the relevance with the video content, and filter the uploaded user-created content based on the relevance (S120). The user may upload the desired user-created content by designating the video content, but in some cases, there may be cases where advertisement messages that are not related to the video content are uploaded indiscriminately. Accordingly, the service server may determine the relevance between the user-created content and the video content, and may not expose the user-created content having a low relevance. In this case, the meta information of the user-created content may include keyword information configured by the user in the user-created content, the geographical location information in which the user-created content is generated, generation date information, capacity information, content type information (image, video, text, etc.), linked video content information, and the like.

In addition, the service server may filter out obscene or violent content, abusive language, or discriminatory expressions, and may also filter out duplicate uploads of the same user-created content. If there are duplicate content uploaded more than the configured number of times among the user-created content, the service server may filter out duplicate content uploaded later than the upload time.

Thereafter, the service server may designate the exposure time of the user-created content during the running time of the video content based on the upload time of the user-created content and the meta information of the user-created content (S130). That is, the service server may designate the exposure time not as the time when the user-created content is uploaded, but as the time when a scene related to the user-created content appears in the video content. When user-created content is exposed simply based on the upload time, the effect of providing user-created content may be degraded, and the response of viewers may also be low. Accordingly, the service server may expose the user-created content when a related scene appears in the video content by designating the exposure time by further considering the meta information of the corresponding user-created content along with the upload time.

Specifically, the service server may extract additional information included in the video content within the configuration time range based on the upload time, and designate the time at which the additional information matching the meta information is included as the exposure time of the user-created content. Here, the additional information may include the title, performer, episode information, and keyword information configured in the video content, and geographical location information displayed in the video content, etc.

Additionally, if the video content is a real-time broadcast, the range determined by the service server may be limited to a certain configuration time range in order to minimize the amount of calculation. However, if video content is a VOD video or before the broadcast of the video content, there may be no need for limitation, so the configuration time range may be configured to the entire running time of the video content.

Thereafter, the service server may display user-created content on a control layer corresponding to the video content when the exposure time is reached during playback of the video content (S140). Here, there may be a case where there are more than the limit number of exposure time points within the configuration time interval, and in this case, the service server may provide a list of user-created content included within the configuration time interval. That is, when a plurality of exposure time points overlaps within a narrow time interval, it may be difficult for the user to distinguish and select each user-created content. Accordingly, the exposure time may be divided into configuration time intervals, and if any one of the configuration time intervals is selected, a list of all user-created content included in the corresponding configuration time interval may be provided. In this case, the user may select desired user-created content based on the corresponding list.

In addition, according to an embodiment, the service server may sequentially slide and display user-created content included in the list based on the exposure time or upload time. That is, since a plurality of user-created content is exposed by rotating or sliding sequentially, the user may identify the user-created content as a whole, and among them, a desired user-created content may be selected.

The disclosure described above may be implemented as a computer-readable code on a medium in which a program is recorded. The computer-readable medium may be one that continuously stores a computer-executable program, or one that temporarily stores the program for execution or download. In addition, the medium may be a variety of recording means or storage means in the form of a single or multiple pieces of hardware combinations, and is not limited to a medium directly connected to a computer system, and may also be distributed on a network. Examples of the medium may include a magnetic medium such as a hard disk, a floppy disk, and a magnetic tape, an optical recording medium such as a CD-ROM and a DVD, a magnetic-optical medium such as a floptical disk, and ROM, RAM, flash memory, etc., configured to store program instructions. In addition, as an example of another medium, there is a recording medium or storage medium managed by app stores that distribute applications, sites that supply or distribute various software, and servers. Therefore, the above detailed description should not be interpreted restrictively in all respects, but should be considered illustrative. The scope of the disclosure should be determined by reasonable interpretation of the appended claims, and all changes within the equivalent scope of the disclosure are included in the scope of the disclosure.

The disclosure is not limited to the above-described embodiments and the accompanying drawings. It will be apparent to those skilled in the art that the components according to the disclosure may be substituted, modified, and changed without departing from the technical idea of the disclosure.

What is claimed is:

1. A method of displaying user-created content (UCC) in video content provided by a service server, the method comprising:

receiving user-created content uploaded in connection with the video content;

designating an exposure time of the user-created content within a running time of the video content, based on an upload time of the user-created content and meta information of the user-created content; and displaying an object corresponding to the user-created content at a position corresponding to the exposure time on a playback bar included in a control layer corresponding to the video content, wherein the designating the exposure time comprises:

extracting additional information from the video content within a predetermined time range determined based on the upload time; and designating, as the exposure time, a time at which the extracted additional information matches the meta information.

2. The method of claim 1, further comprising:

determining a relevance of the user-created content to the video content based on the meta information of the user-created content; and filtering the uploaded user-created content based on the relevance.

3. The method of claim 2, wherein the filtering comprises filtering out, based on respective upload times, later-uploaded user-created content from among duplicate user-created content when the duplicate user-created content has been uploaded more than a predetermined number of times.

4. The method of claim 1, wherein the receiving comprises receiving user-created content from a user terminal or a set-top box.

5. The method of claim 1, wherein the video content comprises at least one of a real-time broadcast video and a video on demand (VOD).

6. The method of claim 1, wherein the meta information comprises at least one of keyword information assigned by a user to the user-created content, geographical location information indicating a location at which the user-created content was generated, generation date information, capacity information, content type information, and linked video content information.

7. The method of claim 1, wherein the designating the exposure time comprises setting the predetermined time range to an entire running time of the video content when the upload time precedes a broadcast start time of the video content.

8. The method of claim 1, wherein the additional information comprises at least one of title information, performer information, episode information, keyword information assigned to the video content, and geographical location information associated with a location appearing in the video content.

9. The method of claim 1, wherein the displaying comprises providing a list of a plurality of items of the user-created content when a number of exposure times respectively designated for the plurality of items within a predetermined time interval exceeds a threshold number.

10. The method of claim 9, wherein the displaying comprises sequentially sliding and displaying the plurality of items of the user-created content included in the list, based on the exposure times respectively designated for the plurality of items or upload times respectively associated with the plurality of items.

11. A non-transitory computer-readable storage medium storing instructions that, when executed by one or more processors, cause the one or more processors to perform the method of claim 1.

12. A service server for displaying user-created content (UCC) in video content, the service server comprising:

a processor configured to:

receive user-created content uploaded in connection with the video content, designate an exposure time of the user-created content within a running time of the video content, based on an upload time of the user-created content and meta information of the user-created content, and display an object corresponding to the user-created content at a position corresponding to the exposure time on a playback bar included in a control layer corresponding to the video content, wherein, to designate the exposure time, the processor is configured to:

extract additional information from the video content within a predetermined time range determined based on the upload time; and designate, as the exposure time, a time at which the extracted additional information matches the meta information.

* * * * *